United States Patent
Ozgun et al.

(10) Patent No.: US 8,140,027 B2
(45) Date of Patent: Mar. 20, 2012

(54) AUTOMATIC FREQUENCY TUNING SYSTEM AND METHOD FOR AN FM-BAND TRANSMIT POWER AMPLIFIER

(75) Inventors: Mehmet T. Ozgun, Plano, TX (US); Luis E. Ossa, Plano, TX (US); Brian P. Ginsburg, Allen, TX (US); Srinath M. Ramaswamy, Murphy, TX (US); Zahir I. Parkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 823 days.

(21) Appl. No.: 12/253,217

(22) Filed: Oct. 16, 2008

(65) Prior Publication Data
US 2010/0099369 A1    Apr. 22, 2010

(51) Int. Cl.
*H01Q 11/12* (2006.01)
*H04B 1/04* (2006.01)
(52) U.S. Cl. .................. 455/91; 455/125; 455/127.1
(58) Field of Classification Search ............... 455/91, 455/125, 127.1–127.3
See application file for complete search history.

(56) References Cited

U.S. PATENT DOCUMENTS

| | | | |
|---|---|---|---|
| 6,160,449 A * | 12/2000 | Klomsdorf et al. | 330/149 |
| 6,167,242 A * | 12/2000 | Henderson et al. | 455/126 |
| 6,756,849 B2 * | 6/2004 | Dupuis et al. | 330/279 |
| 7,154,329 B2 * | 12/2006 | Douglas | 330/2 |
| 7,420,425 B2 * | 9/2008 | Tsai | 330/311 |
| 7,433,658 B1 * | 10/2008 | Shirvani-Mahdavi et al. | 455/127.2 |
| 7,843,267 B2 * | 11/2010 | Anand | 330/285 |
| 2004/0056720 A1 * | 3/2004 | Jansen et al. | 330/279 |
| 2009/0046030 A1 * | 2/2009 | Song et al. | 343/852 |
| 2009/0096533 A1 * | 4/2009 | Paul et al. | 330/305 |

* cited by examiner

*Primary Examiner* — Simon Nguyen
(74) *Attorney, Agent, or Firm* — Alan A. R. Cooper; Wade James Brady, III; Frederick J. Telecky, Jr.

(57) ABSTRACT

An automatic frequency tuning system and method for a transmit power amplifier. The transmit power amplifier has an antenna feed line including a series capacitor and is coupled to an output of an output driver. In one embodiment, the system includes: (1) a shunt capacitor array having a plurality of capacitors selectably couplable to the antenna feed line to apply a programmable shunt capacitance thereto, (2) a peak detector circuit couplable to nodes of the antenna feed line associated with both terminals of the series capacitor and (3) a processor configured to control the peak detector circuit to determine a ratio of voltage levels measured at the nodes at a given power level of the output driver.

22 Claims, 3 Drawing Sheets

AUTOMATIC FREQUENCY TUNING SYSTEM AND METHOD FOR AN FM-BAND TRANSMIT POWER AMPLIFIER

TECHNICAL FIELD OF THE INVENTION

The invention is directed, in general, to radio frequency (RF) transmitters and, more specifically, to an automatic frequency tuning system and method for a transmit power amplifier.

BACKGROUND OF THE INVENTION

The FM band (i.e., a frequency band between about 76 and about 108 MHz) is used worldwide. FM-band transmitters find broad application in many types of wireless devices, including mobile cellular devices.

The Q factor, or quality factor, is a dimensionless ratio relating the resonant frequency of a device or circuit to its power dissipation; the higher the Q factor, the greater the efficiency. The Q factor of a loop antenna, such as may be printed on a printed circuit board, can be high. However, its Q factor decreases as frequency decreases. A quarter-wavelength FM-band printed loop antenna would have to be about 75 cm long, which is impractical for mobile cellular devices. The efficiency of a loop antenna that is practical in such devices is relatively low for the FM band.

While the Q factor is low, it still varies materially over the 76 MHz to 108 MHz range of the FM band. This causes the power of the transmitted signal to vary from one end of the band to the other, which is disadvantageous. Unfortunately, decreasing the antenna's Q factor to stabilize the power decreases its efficiency and increases its power dissipation. This is disadvantageous in battery-powered devices.

SUMMARY OF THE INVENTION

One aspect of the invention provides an automatic frequency tuning system for a transmit power amplifier. The transmit power amplifier has an antenna feed line including a series capacitor and is coupled to an output of an output driver. In one embodiment, the system includes: (1) a shunt capacitor array having a plurality of capacitors selectably couplable to the antenna feed line to apply a programmable shunt capacitance thereto, (2) a peak detector circuit couplable to nodes of the antenna feed line associated with both terminals of the series capacitor and (3) a processor configured to control the peak detector circuit to determine a ratio of voltage levels measured at the nodes at a given power level of the output driver.

Another aspect of the invention provides an automatic frequency tuning method for a transmit power amplifier as structured above. In one embodiment, the method includes: (1) setting a synthesizer frequency to a desired FM-band channel frequency, (2) setting the output driver at a power level at which insubstantial leakage occurs in bands other than the FM band, (3) finding a shunt capacitor setting that corresponds to a minimum voltage level at a first node between the output driver and the series capacitor, (4) increasing the power level to a level at which the peak detector circuit is capable of sensing differences between measurement points close to a voltage gain peak, (5) computing ratios of measured voltage levels at the first node and a second node across the series capacitor from the first node for a plurality of shunt capacitor settings and (6) programming the shunt capacitor array with a shunt capacitor setting associated with one of the ratios.

In another embodiment, the method includes: (1) shorting inputs of a peak detector circuit together, (2) measuring a DC offset of a sense amplifier of the peak detector circuit, (3) setting a synthesizer frequency to a desired FM channel frequency, (4) setting a power level of an FM transmitter to a level at which insubstantial leakage occurs in bands other than the FM band, (5) connecting an input of the peak detector circuit to a first node between an output driver and a series capacitor, (6) adjusting an attenuation ratio of a capacitor divider at an input of the peak detector circuit, (7) sweeping shunt capacitor settings across a range of settings, (8) finding a minimum of voltage measurements, (9) increasing the power level to a level at which the peak detector circuit can sense differences between the measurement points proximate a voltage gain peak, (10) sweeping shunt capacitor settings about the voltage gain peak and (11) computing a voltage level ratio at each of the shunt capacitor settings.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
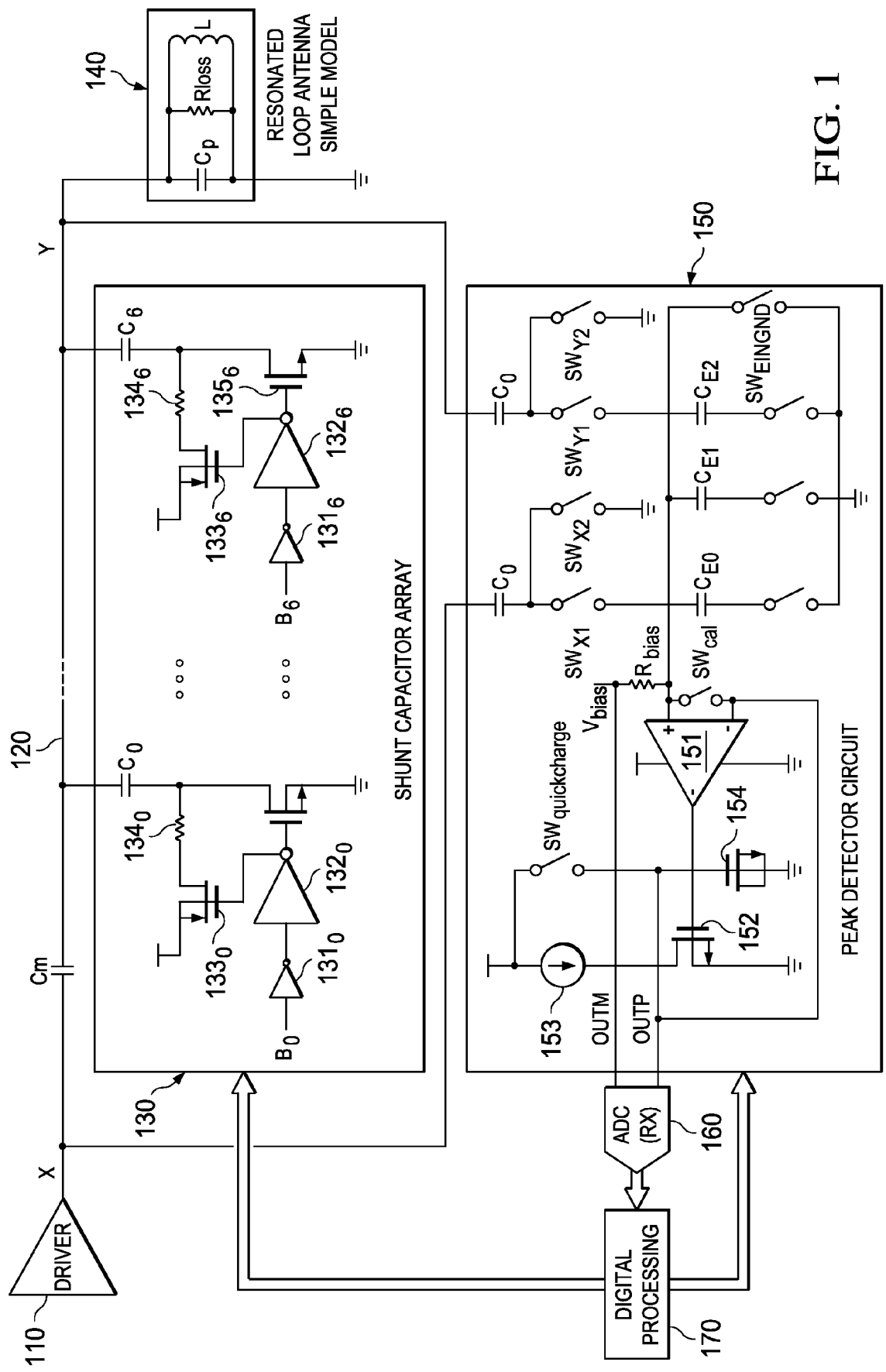
FIG. 1 is a diagram of one embodiment of an automatic frequency tuning system for a transmit power amplifier.

In the following discussion, "on-chip" denotes components that share the same substrate with the majority of the transmit power amplifier, and "off-chip" denotes components that do not share the same substrate with the majority of the transmit power amplifier and therefore are merely electrically coupled to the remainder of the transmit power amplifier. Internal circuits use on-chip components.

An internal impedance-matching network associated with a transmit power amplifier may be employed to adjust the Q factor of a loop antenna coupled to the output of the amplifier. To provide proper operation over the FM band, the impedance-matching network can be adjusted as the transmit frequency changes such that the output of the amplifier matches to the antenna impedance at the frequency. More specifically, the impedance-matching network of the transmit power amplifier in a transmitter may be appropriately adjusted to maximize the power of the transmitted signal and maximally attenuate higher harmonics of the transmitted signal.

While any adjustable impedance-matching network may be employed to tune a loop antenna, one embodiment of a network to be described herein is internal and implemented with capacitors, as on-chip inductors are not possible for FM frequencies due to their low Q factors. In one embodiment, Q factors of on-chip capacitors are higher than the Q factor of the antenna in order to reduce the loss and increase the efficiency of the transmit power amplifier. In one embodiment, metal-insulator-metal capacitors are used to enhance the linearity of the network. Because antenna characteristics may vary from one device to another, one embodiment of the impedance-matching network provides tuning that is wide enough to compensate for device-dependent antenna characteristics as well as provide the tuning required for the FM band, i.e., from 76 MHz to 108 MHz. Antenna impedance may change in response to changes in ambient temperature or electromagnetic field caused by, e.g., humidity, a human body or a magnetic device proximate the antenna. Therefore, one embodiment tunes impedance occasionally, and perhaps periodically, during device normal operation to account for changes in antenna impedance.

Finally, certain embodiments of the adjustable impedance-matching network function in FM transmitters that operate concurrently with other wireless radios in the same mobile cellular device. Accordingly, leakage of the transmitted FM signal to the frequency bands of these other wireless radios should be within the allowed limits even while the impedance-matching network is being tuned in order not to interrupt any of the other wireless radios' activities.

Given the above, described herein are various embodiments of a capacitive impedance-matching network that matches the output of a transmit power amplifier to an antenna as the frequency of operation changes. In certain embodiments, the tuning range of the impedance-matching network is wide enough to cover all the internal capacitance variances and antenna impedance variances.

FIG. 1 is a diagram of one embodiment of an automatic frequency tuning system for a transmit power amplifier. FIG. 1 shows an output driver 110 coupled to an antenna 140 via an antenna feed line 120 that includes a series capacitor Cm. The output driver 110 typically receives its input signal from a filter (not shown), which in turn receives its input signal from a synthesizer (also not shown). The antenna 140, which is a printed loop antenna in the illustrated embodiment, is straightforwardly modeled as a capacitance Cp, a resistance Rloss and an inductance L.

A shunt capacitor array 130 is also coupled to the antenna feed line 120. The shunt capacitor array 130 contains an array of capacitors that may be selectively coupled in parallel to shunt the antenna feed line 120 to ground (shown but not referenced) with a programmable capacitance. The specific embodiment of the shunt capacitor array 130 of FIG. 1 shows seven shunt capacitors $C_0, \ldots, C_6$, although different numbers of shunt capacitors are employed in alternative embodiments. In the illustrated embodiment, the shunt capacitors are related to one another as powers of two: $C_0$ is the smallest capacitance, and $C_6$ has 26 times as much capacitance as $C_0$.

Each of the shunt capacitors $C_0, \ldots, C_6$, is selectively closed or opened by way of a corresponding state bit $B_0, \ldots, B_6$ provided to a corresponding bit input of a first inverter $131_0, \ldots, 131_6$ that, in turn, drives a second inverter $132_0, \ldots, 132_6$. If a state bit $B_0, \ldots, B_6$ is zero, a corresponding p-channel metal oxide semiconductor (PMOS) field-effect transistor (FET) $133_0, \ldots, 133_6$ is turned on, and the antenna feed line 120 is weakly coupled to the voltage rail through the corresponding shunt capacitor $C_0, \ldots, C_6$ and a corresponding resistor $134_0, \ldots, 134_6$. A corresponding n-channel metal oxide semiconductor (NMOS) FET $135_0, \ldots, 135_6$ is turned off, isolating the antenna feed line 120 from ground. If a state bit $B_0, \ldots, B_6$ is one, the corresponding NMOS FET $135_0, \ldots, 135_6$ is turned on, and the antenna feed line 120 is strongly coupled to ground through a corresponding shunt capacitor $C_0, \ldots, C_6$. The corresponding PMOS FET $133_0, \ldots, 133_6$ is turned off, isolating the antenna feed line 120 from the voltage rail. Thus, a capacitor network can be established that couples the antenna feed line 120 to one or both of the voltage rail and the ground via various of the shunt capacitors $C_0, \ldots, C_6$. The state bits $B_0, \ldots, B_6$ may be thought of as constituting a shunt capacitor setting.

A peak detector circuit 150 is also coupled to the antenna feed line 120 at a node X and a node Y, which straddle the series capacitor Cm. The peak detector circuit 150 is coupled to the nodes X and Y via capacitors $C_0$. Switches $SW_{X1}$ and $SW_{X2}$ are controlled to couple the capacitor $C_0$ that is coupled to the node X either to a noninverting input of a sense amplifier 151 or ground. Switches $SW_{Y1}$ and $SW_{Y2}$ are controlled to couple the capacitor $C_0$ that is coupled to the node Y to the noninverting input of the sense amplifier 151 or ground. Various unreferenced switches are controlled to couple the noninverting input of the sense amplifier 151 to ground, either indirectly through an adjustable input capacitor array $C_{E0}$, $C_{E1}$ or $C_{E2}$, or directly in the case of a switch $SW_{ENGND}$. The noninverting input of the sense amplifier 151 is routed through a bias resistor $R_{bias}$ and provided as a differential output OUTM to a first differential input of an analog-to-digital converter (ADC) 160. An inverting input of the sense amplifier 151 is provided as a differential output OUTP to a second differential input of the ADC 160 and further controllably coupled to the voltage rail by a switch $SW_{quickcharge}$. An NMOS FET 152 is coupled to an inverting output of the sense amplifier 151, applying current from a current source 153 to the inverting input and OUTP based on the state of the inverting output. An NMOS FET 154 capacitively couples OUTP to ground. A calibration switch $SW_{cal}$ closes to allow the sense amplifier 151 to be calibrated.

The ADC 160 provides a digital signal to a digital processing circuit 170. The digital processing circuit 170, which may include a processor of any suitable type or capability, is coupled to the shunt capacitor array 130 and the peak detector circuit 150, namely the various switches therein, to open and close the switches to perform various functions. In a manner to be described below, the digital processing circuit 170 employs the shunt capacitor array 130 and the peak detector array 150 to determine how best to configure the shunt capacitor array to match the output driver 110 to the antenna 140 at a particular FM frequency.

In the illustrated embodiment, the shunt capacitor array 130 is adjusted as transmit frequency or the antenna impedance changes by automatically adjusting the total shunt capacitor value from the antenna feed line 120 to ground. The series capacitors $C_0$ behave like an AC coupling capacitor, allowing the sense amplifier 151 to be biased separately. To find the appropriate bit setting $B_0, \ldots, B_6$ for the shunt capacitor array 130, the two ends of the series capacitor Cm are connected to the peak detector circuit 150 through the capacitors $C_0$. Furthermore, along with the parasitic capacitor of the sense amplifier 151 and the adjustable input capacitor array $C_{E0}, C_{E1}, C_{E2}$, the two separate series capacitors $C_0$ act like a capacitive attenuator, which improves the dynamic range of the peak detector circuit and causing it to act like a companding system. Through a feedback loop, the sense amplifier 151 senses the negative peaks of the FM signal provided by the output driver 110. The time-constant of the peak detector circuit 150 depends on the total impedance on the output provided to OUTP.

The FM transceiver with which the output driver 110 is associated is a half-duplex system. Thus, the receiver path (not shown) is not active while the output driver 110 is on. Consequently, using the ADC 160 to calibrate the FM transmitter will not interrupt any other activities on the ADC 160 in the illustrated embodiment. In one embodiment, the ADC 160 is used to receive other analog input signals during the transmit operation. However, this embodiment complicates the periodic calibration of the power amplifier during the normal transmit operation. The illustrated embodiment does not use the ADC 160 to receive other analog input signals during the transmit operation. The digital processing circuit 170 processes the output of the ADC 160 digitally to define optimum shunt capacitor settings for the shunt capacitor array 130.

As described above, the two ends of the series capacitor Cm of the impedance-matching network, shown as the node X and the node Y in FIG. 1, are connected to the input of the peak detector circuit 150 through the capacitors $C_0$ and the switches $SW_{X1}$, $SW_{X2}$, $SW_{Y1}$, $SW_{Y2}$. The values of the capacitors $C_0$ have been chosen to be close to the finest capacitor value $C_0$ in the shunt capacitor array 130 to prevent any degradation on the performance of the transmit power amplifier. During the normal operation of the transmitter, the switches $SW_{X2}$ and $SW_{Y2}$ are turned on in order to connect the capacitors $C_0$ to ground and prevent them from floating. Similarly, $SW_{ENGND}$ is closed to connect the input of the sense amplifier 151 to ground to prevent its intrinsic capacitor from floating as well. Floating capacitors would create nonlinearities and degrade the performance of the adjustment of the shunt capacitor array 130 and ultimately the performance of the FM transmitter.

During the calibration cycle of the FM transmitter, the DC offset calibration of the sense amplifier 151 is initially determined. To measure the DC offset, its noninverting and inverting inputs are shorted together by enabling the switch $SW_{cal}$. During this calibration stage, the switches $SW_{X1}$, $SW_{Y1}$ and $SW_{ENGND}$ are opened. During the calibration cycle of the transmitter, if the node X is connected to the peak detector circuit 150, the switches $SW_{X1}$, $SW_{Y2}$ are closed, and the switches $SW_{X2}$, $SW_{Y1}$, $SW_{ENGND}$ are opened. Similar to the operation explained above, the switch $SW_{Y2}$ is closed in order to prevent the capacitor $C_0$ coupled to the node Y from floating. The states of the switches associated with the input capacitor array $C_{E0}$, $C_{E1}$, $C_{E2}$ at the input of the sense amplifier 151 are decided according to the required attenuation ratio depending on the output signal swing of the output driver 110.

Similarly, during the calibration cycle of the FM transmitter, if the node Y is connected to the peak detector circuit 150, the switches $SW_{X2}$, $SW_{Y1}$ are closed, and the switches $SW_{X1}$, $SW_{Y2}$, $SW_{ENGND}$ are opened.

The frequency tuning method described herein aims to increase the voltage gain between the nodes X and Y in FIG. 1, which is the voltage gain of the impedance-matching network. This maximizes the voltage across the antenna 140 and the linearity of the transmitted output power.

Figure 2:
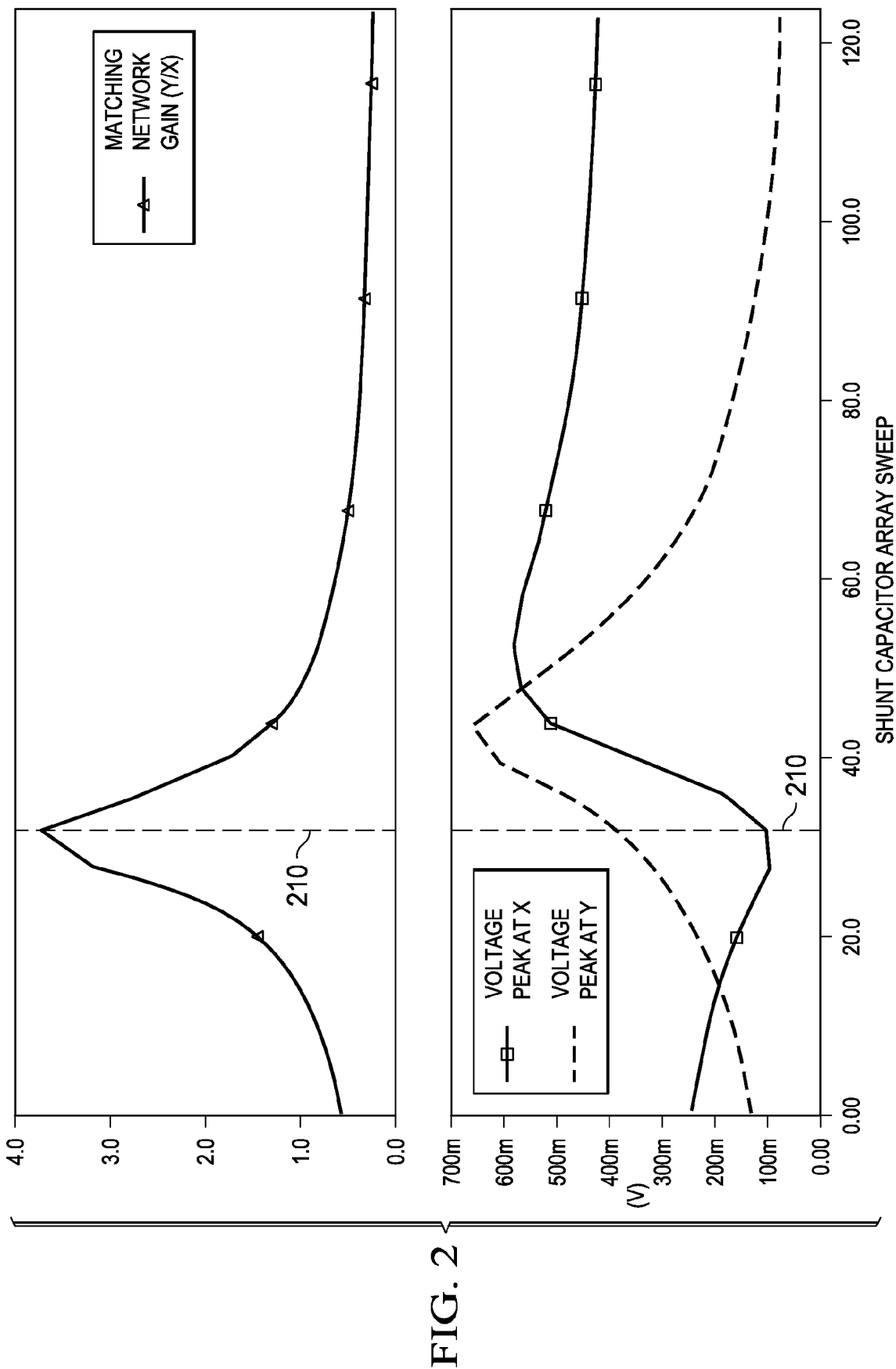
FIG. 2 is a graph of impedance-matching network voltage gains and peak voltages across a series capacitor of the transmit power amplifier as a shunt capacitor array thereof is swept through each of a plurality of settings.

FIG. 2 is a graph of impedance-matching network voltage gains and peak voltages across a series capacitor of the transmit power amplifier as the shunt capacitor array 130 is swept through each of a plurality of settings. The upper waveform shows the impedance-matching network gain as the shunt capacitor value is swept. The lower waveforms show the peak of the voltages at the nodes X and Y in FIG. 1. As FIG. 2 shows, the peak voltage at the node Y, which provides maximum output power, does not necessarily match with the peak of impedance-matching network voltage gain. However, as mentioned above, the aim is to transmit as much power as possible without creating substantial nonlinearities. Maximizing the voltage gain of the impedance-matching network ensures the maximum output power as well. As an example, as it is seen with the line 210, the maximum impedance-matching network gain is about 3.8 and if we assume a maximum internal peak voltage of about 550 mV, the output voltage peak is about 2.09 V, which is higher than the maximum voltage peak at the node Y in FIG. 2.

Another complication during the tuning procedure is the power leaking into other wireless radios' frequency bands, which especially occurs if the internal signal swing goes above some threshold voltage, which is close to Vdd/2-Vdsat, where Vdsat is the drain-source saturation voltage of the PMOS FETs in the output driver 110 of FIG. 1, the distortion of the transmitted signal increases, which causes an increase in the leakage power. Hence, the transmitted power level during the tuning sequence should be sufficiently low not to cause any degradation in the performance of other wireless radios (e.g., operating in the GSM band). However, if the transmitted signal power is too low, the peak detector circuit 150 may not capture differences between data points close to the minima of the voltage peaks at the node X, where the impedance-matching network voltage gain reaches its maxima. Thus, the transmitted power level during the tuning sequence should be adjusted appropriately.

With these considerations in mind, described herein are various embodiments of an automatic tuning method that tunes the impedance-matching network automatically for the required transmit frequency. Certain embodiments of the method are performed before the normal operation of the FM transmitter is activated. Other embodiments of the method are performed occasionally and periodically during the normal operation of the FM transmitter in order to adjust to varying operating conditions of the antenna. Still other embodiments of the method ensure that the leakage of the transmitted power to the other wireless radios' frequency operation bands are within the specified limits in order to prevent any interruption on the activities of those wireless radios.

Figure 3:
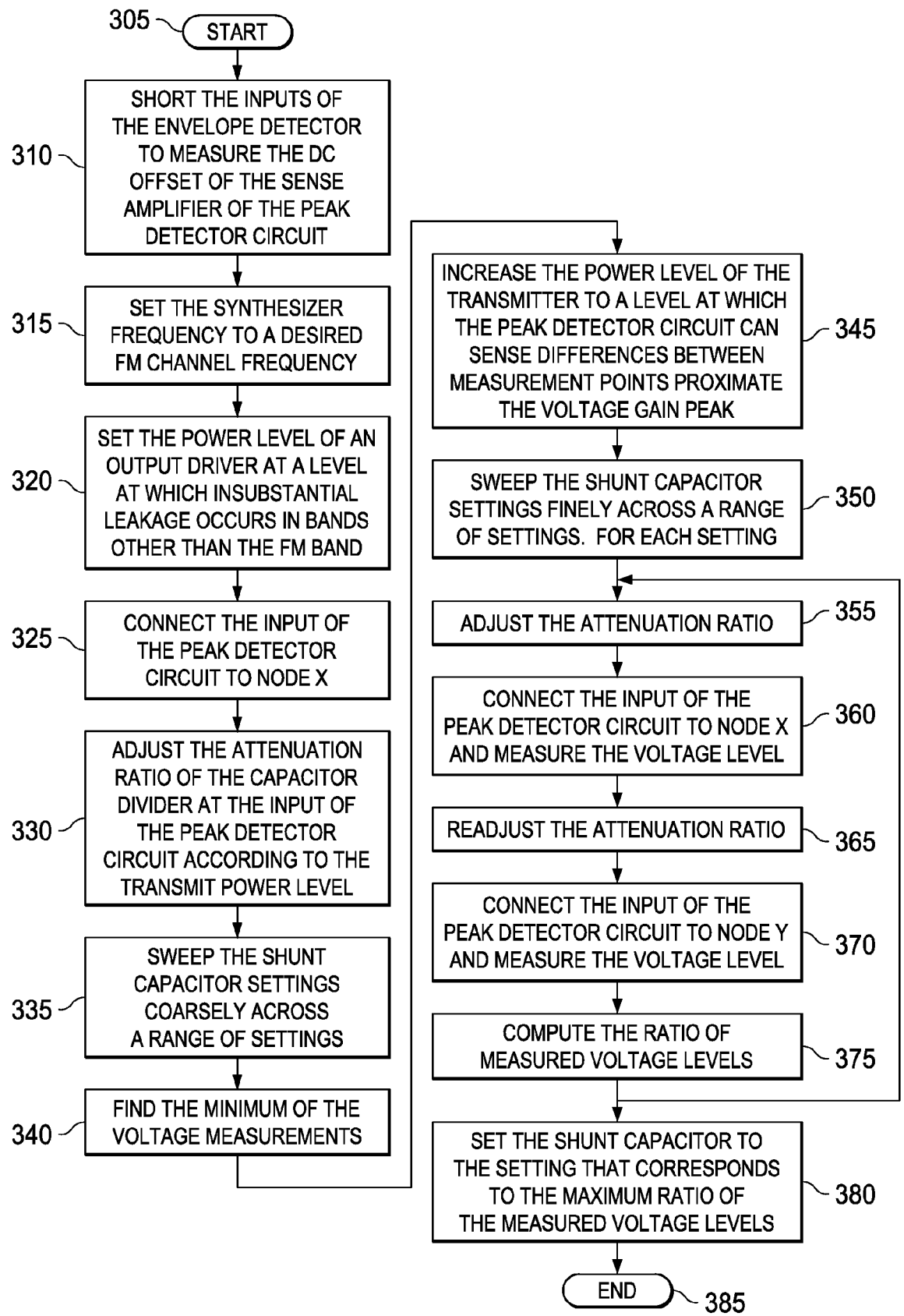
FIG. 3 is a flow diagram of one embodiment of an automatic frequency tuning method for a transmit power amplifier.

FIG. 3 is a flow diagram of one embodiment of an automatic frequency tuning method for a transmit power amplifier. The method begins in a start step 305. In a step 310, the inputs of the peak detector circuit 150 are shorted together in order to measure the DC offset of the sense amplifier of the peak detector circuit 150. In a step 315, the synthesizer frequency is set to a desired FM channel frequency. In one embodiment, the synthesizer is modulated. However, in the illustrated embodiment, the synthesizer is not modulated.

In a step 320, the power level of the FM transmitter is set to a low enough level such that there is no substantial leakage in the other wireless radios' bands. In a step 325, the input of the peak detector circuit 150 is connected to the node X in FIG. 1. In a step 330, the attenuation ratio of the capacitor divider at the input of the peak detector circuit 150 is adjusted according to the transmit power level.

In a step 335, the shunt capacitor settings are swept across a range of settings. In the embodiment of FIG. 1 in which seven state bits, $B_0, \ldots, B_6$ are used to configure the shunt capacitor array 130, the shunt capacitor settings are swept from 0 to 127. In one embodiment, the shunt capacitor settings are swept by a step size of eight. However, the step size differs in other embodiments.

In a step 340, the minimum of the measurements is found. For purposes of this description, the minimum of the measurements is labeled "Cmincoarse." Since the relative values between each measurement are being compared, the accuracy of the attenuation ratio is not important. In a step 345, the power level of the FM transmitter is increased to a high enough level such that the peak detector circuit 150 can sense the differences between the measurement points close to the voltage gain peak. In a step 350, the shunt capacitor settings are swept about the voltage gain peak. In one embodiment, the shunt capacitor settings are swept from Cmincoarse−8 to Cmincoarse+8 by a step size of one. However, the range and step size of the sweeping differ in other embodiments.

In a step 350, at each measurement step, the following steps are repeated. In a step 355, the value of the attenuation ratio is adjusted. In a step 360, the input of the peak detector circuit 150 is connected to the node X and the voltage level measured. In a step 365, the value of the attenuation ratio is adjusted again. In a step 370, the input of the peak detector circuit 150 is connected to the node Y and the voltage level measured. In a step 375 the ratio between the measurement values determined in the steps 360 and 370 is computed.

In a step 380, the shunt capacitor setting corresponding to the maximum ratio is determined, and the shunt capacitor array 130 is set to that shunt capacitor setting by setting the state bits $B_0, \ldots, B_6$ accordingly. The method ends in an end step 385.

Turning back to FIG. 1 but with continuing reference to FIG. 3, the reactance of the antenna 140 typically varies with changing environmental conditions. While the entire tuning range of the shunt capacitor array 130 is necessary to handle all transmission frequencies and process variations on-chip, the magnitude of the reactance change with environmental conditions is often substantially smaller. Thus, for an incremental re-tuning of the FM transmitter, only the steps 350 through 380 of the method of FIG. 3 need to be re-executed, where the center code (Cmincoarse) is replaced with the previously found shunt capacitor setting.

Those skilled in the art to which the invention relates will appreciate that other and further additions, deletions, substitutions and modifications may be made to the described embodiments without departing from the scope of the invention.

What is claimed is:

1. An automatic frequency tuning system for a transmit power amplifier having an antenna feed line coupled to an output of an output driver, comprising:
   a shunt capacitor array having a plurality of series capacitors selectably couplable to said antenna feed line to apply a programmable shunt capacitance thereto;
   a peak detector circuit couplable to said antenna feed line associated with a first terminal node and a last terminal node of said series capacitors, said peak detector circuit further including:
      a) a first switch and a second switch that are configured to couple a first capacitor of the peak detector circuit, which is also coupled to the first terminal node, either to
         i) a noninverting input of a sense amplifier of the peak detector circuit; or
         ii) ground; and
   a processor configured to control said peak detector circuit to determine a ratio of voltage levels measured at said nodes at a given power level of said output driver.

2. The system as recited in claim 1 wherein said plurality of capacitors have capacitances related to one another by powers of two.

3. The system as recited in claim 1 wherein said peak detector comprises series capacitors corresponding to said nodes and a sense amplifier having an input couplable to alternative ones of said nodes via alternative ones of said a series capacitors.

4. The system as recited in claim 1 wherein said given power level is a power level at which said peak detector circuit is capable of sensing differences between measurement points proximate a voltage gain peak.

5. The system as recited in claim 1 wherein said ratio is a maximum ratio.

6. The system as recited in claim 1 wherein said processor is coupled to said shunt capacitor array and further configured to program said shunt capacitor array with a shunt capacitor setting associated with said ratio.

7. The system as recited in claim 1 wherein said peak detector comprises an input capacitor array.

8. The automatic frequency tuning system of claim 1, said peak detector circuit further including:
   a) a third switch and a fourth switch that are configured to couple a second capacitor of the peak detector circuit, which is also coupled to the last terminal node, either to
      i) the noninverting input of the sense amplifier of the peak detector circuit; or
      ii) ground.

9. The automatic frequency tuning system of claim 1, wherein the peak detector circuit is couplable in a feedback configuration.

10. An automatic frequency tuning method for a transmit power amplifier having an antenna feed line including a series capacitor and coupled to an output of an output driver, comprising:
    setting a synthesizer frequency to a desired FM-band channel frequency;
    setting said output driver at a power level at which insubstantial leakage occurs in bands other than said FM band;
    finding a shunt capacitor setting that corresponds to a minimum voltage level at a first node between said output driver and said series capacitor;
    increasing said power level to a level at which said peak detector circuit is capable of sensing differences between measurement points close to a voltage gain peak;
    computing ratios of measured voltage levels at said first node and a second node across said series capacitor from said first node for a plurality of shunt capacitor settings; and
    programming said shunt capacitor array with a shunt capacitor setting associated with one of said ratios.

11. The method as recited in claim 10 wherein said finding comprises:
    connecting an input of a peak detector circuit to said first node;
    adjusting an attenuation ratio of a capacitor divider of said peak detector circuit according to said power level;
    sweeping said shunt capacitor array across a range of settings; and
    finding said minimum voltage level.

12. The method as recited in claim 10 wherein said computing said ratios comprises:
    adjusting an attenuation ratio of a capacitor divider of said peak detector circuit according to said power level;
    connecting said peak detector circuit to said first node;
    measuring a first voltage level;
    readjusting said attenuation ratio;
    connecting said peak detector circuit to said second node;
    measuring a second voltage level; and
    computing a ratio of said first and second voltage levels.

13. The method as recited in claim 10 wherein said finding comprises sweeping shunt capacitor settings coarsely across a range of settings.

14. The method as recited in claim 10 wherein said sweeping comprises sweeping said shunt capacitor array finely across a range of settings.

15. The method as recited in claim 10 wherein said shunt capacitor array contains a plurality of capacitors having capacitances related to one another by powers of two.

16. The method as recited in claim 10 wherein said bands include a GSM band.

17. The method as recited in claim 10 wherein said shunt capacitor settings comprise a plurality of state bits.

18. An automatic frequency tuning method for a transmit power amplifier having an antenna feed line including a series capacitor and coupled to an output of an output driver, comprising:
- shorting inputs of a peak detector circuit together;
- measuring a DC offset of a sense amplifier of said peak detector circuit;
- setting a synthesizer frequency to a desired FM channel frequency;
- setting a power level of an FM transmitter to a level at which insubstantial leakage occurs in bands other than the FM band;
- connecting an input of said peak detector circuit to a first node between an output driver and a series capacitor;
- adjusting an attenuation ratio of a capacitor divider at an input of said peak detector circuit;
- sweeping shunt capacitor settings across a range of settings;
- finding a minimum of voltage measurements;
- increasing said power level to a level at which said peak detector circuit can sense differences between the measurement points proximate a voltage gain peak;
- sweeping shunt capacitor settings about said voltage gain peak; and
- computing a voltage level ratio at each of said shunt capacitor settings.

19. The method as recited in claim 18 wherein said computing comprises:
- adjusting an attenuation ratio;
- connecting an input of said peak detector circuit to said first node;
- measuring a first voltage level;
- readjusting said attenuation ratio;
- connecting an input of said peak detector circuit to a second node across a series capacitor from said first node; and
- measuring a second voltage level.

20. The method as recited in claim 18 further comprising:
- determining a shunt capacitor setting corresponding to said voltage level ratio; and
- setting said shunt capacitor array to said shunt capacitor setting by setting state bits accordingly.

21. The method as recited in claim 18 wherein said voltage level ratio is a maximum voltage level ratio.

22. The method as recited in claim 18 wherein said sweeping said shunt capacitor settings across said range of settings comprises sweeping said shunt capacitor settings across a full range of settings at a coarse step size and said sweeping said shunt capacitor settings about said voltage gain peak comprises sweeping said shunt capacitor settings across a reduced range of settings at a fine step size that is less than said coarse step size.

* * * * *